United States Patent
Matejczyk et al.

(10) Patent No.: US 10,259,043 B2
(45) Date of Patent: Apr. 16, 2019

(54) ADDITIVE MANUFACTURING FOR ELEVATED-TEMPERATURE DUCTILITY AND STRESS RUPTURE LIFE

(71) Applicant: PRATT & WHITNEY ROCKETDYNE, INC., Canoga Park, CA (US)

(72) Inventors: Daniel E. Matejczyk, West Hills, CA (US); Colin L. Swingler, Woodland Hills, CA (US)

(73) Assignee: AEROJET ROCKETDYNE OF DE, INC., Canoga Park, CA (US)

( * ) Notice: Subject to any disclaimer, the term of this patent is extended or adjusted under 35 U.S.C. 154(b) by 733 days.

(21) Appl. No.: 14/761,743

(22) PCT Filed: May 31, 2013

(86) PCT No.: PCT/US2013/043664
§ 371 (c)(1),
(2) Date: Jul. 17, 2015

(87) PCT Pub. No.: WO2014/120264
PCT Pub. Date: Aug. 7, 2014

(65) Prior Publication Data
US 2015/0336171 A1  Nov. 26, 2015

Related U.S. Application Data

(60) Provisional application No. 61/759,886, filed on Feb. 1, 2013.

(51) Int. Cl.
B22F 3/24 (2006.01)
B22F 5/00 (2006.01)
(Continued)

(52) U.S. Cl.
CPC .............. *B22F 3/1055* (2013.01); *B22F 3/24* (2013.01); *B22F 5/009* (2013.01); *B23K 20/023* (2013.01);
(Continued)

(58) Field of Classification Search
CPC .......... B22F 3/24; B22F 3/1055; B22F 5/009; B22F 2003/248; B22F 2003/1056;
(Continued)

(56) References Cited

U.S. PATENT DOCUMENTS 6,830,643 B1 * 12/2004 Hayes .................... B41M 3/006
 118/308
7,524,382 B2 * 4/2009 Fink .......................... C23C 8/02
 148/206

(Continued)

FOREIGN PATENT DOCUMENTS

JP  2005048234  2/2005
JP  4508771  7/2010

OTHER PUBLICATIONS

International Search Report for PCT Application No. PCT/US2013/043664 completed Oct. 18, 2013.

*Primary Examiner* — Keith Walker
*Assistant Examiner* — John A Hevey
(74) *Attorney, Agent, or Firm* — Joel G. Landan

(57) ABSTRACT

A manufacturing process includes additive manufacturing a component; and precipitating carbides at grain boundaries of the component.

1 Claim, 5 Drawing Sheets

(51) Int. Cl.
- *B22F 3/105* (2006.01)
- *B23K 20/02* (2006.01)
- *B23K 26/12* (2014.01)
- *B23K 26/32* (2014.01)
- *B33Y 10/00* (2015.01)
- *C22C 32/00* (2006.01)
- *C23C 24/08* (2006.01)
- *B23K 101/00* (2006.01)
- *B23K 103/02* (2006.01)
- *B23K 103/10* (2006.01)
- *B23K 103/14* (2006.01)
- *B23K 103/18* (2006.01)
- *B23K 20/233* (2006.01)
- *B23K 26/144* (2014.01)
- *B23K 26/342* (2014.01)
- *C23C 8/02* (2006.01)
- *C23C 8/20* (2006.01)
- *B33Y 30/00* (2015.01)

(52) U.S. Cl.
CPC .......... *B23K 20/233* (2013.01); *B23K 26/127* (2013.01); *B23K 26/144* (2015.10); *B23K 26/32* (2013.01); *B23K 26/342* (2015.10); *C22C 32/0052* (2013.01); *C23C 8/02* (2013.01); *C23C 8/20* (2013.01); *C23C 24/08* (2013.01); *B22F 2003/1056* (2013.01); *B22F 2003/248* (2013.01); *B23K 2101/001* (2018.08); *B23K 2103/02* (2018.08); *B23K 2103/10* (2018.08); *B23K 2103/14* (2018.08); *B23K 2103/26* (2018.08); *B33Y 10/00* (2014.12); *B33Y 30/00* (2014.12); *Y02P 10/295* (2015.11)

(58) Field of Classification Search
CPC .... B23K 26/32; B23K 26/342; B23K 26/144; B23K 26/127; B23K 20/023; B23K 20/233; C22C 32/0052; C23C 24/08; C23C 8/02; C23C 8/20; Y02P 10/295; B33Y 10/00; B33Y 30/00
See application file for complete search history.

(56) References Cited

U.S. PATENT DOCUMENTS

| | | |
|---|---|---|
| 2011/0311389 A1 | 12/2011 | Ryan et al. |
| 2012/0018926 A1 | 1/2012 | Mannella et al. |
| 2013/0015609 A1 | 1/2013 | Landau |
| 2013/0071562 A1* | 3/2013 | Szuromi ............... B22F 3/1055 427/237 |
| 2013/0195673 A1* | 8/2013 | Godfrey ................ B23P 15/04 416/241 R |
| 2013/0263977 A1* | 10/2013 | Rickenbacher .......... B05D 3/06 148/540 |
| 2014/0295087 A1* | 10/2014 | Rickenbacher ....... B22F 3/1055 427/383.1 |

\* cited by examiner

ADDITIVE MANUFACTURING FOR ELEVATED-TEMPERATURE DUCTILITY AND STRESS RUPTURE LIFE

The present disclosure claims priority to U.S. Provisional Patent Disclosure Ser. No. 61/759,886, filed Feb. 1, 2013.

BACKGROUND

The present disclosure relates generally to additive manufacturing systems and processes.

Additive manufacturing processes use 3D CAD data as a digital information source and an energy source such as a high powered laser beam to form three-dimensional metal parts by fusing fine metallic powders. Some alloys may have different characteristics when additive manufactured as compared to the wrought alloy.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
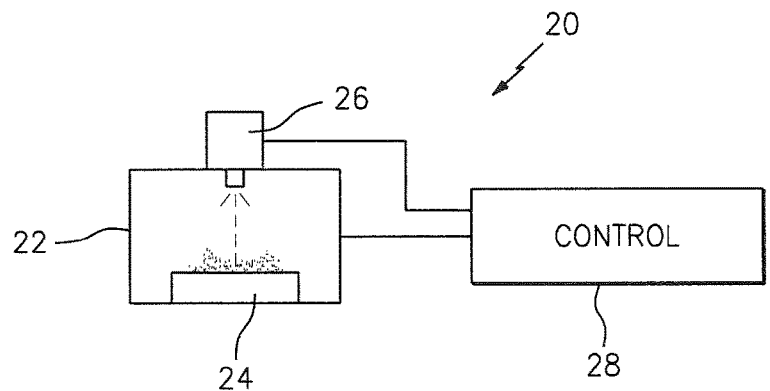
FIG. 1 is a general schematic view of an additive manufacturing system according to one disclosed non-liming embodiment.

FIG. 1 schematically illustrates an additive manufacturing system 20. The system 20 generally includes a build chamber 22 with a powder bed 24, one or more energy sources 26 such as a laser and a control 28 (all illustrated schematically). It should be appreciated that as defined herein, "additive manufacturing" systems include but are not limited to Selective Laser Melting (SLM), Powder-Bed Electron Beam Melting (EBM), Electron Beam Free Form Fabrication (EBF3), Laser Engineered Net Shape (LENS), and others. It should be also appreciated that various components and subsystems may additionally or alternatively provided.

The additive manufacturing system 20 builds components by consecutively melting 2-D layers of atomized alloy powder material to create the 3-D solid body defined by the CAD file. Various metallic powders may be used, including iron, nickel, cobalt, titanium or aluminum-base alloys. Alloy 625, Alloy 718 and Alloy 230 may be used for components that operate in a high temperature environment such as is typical of aerospace and gas turbine engine components.

Figure 2:
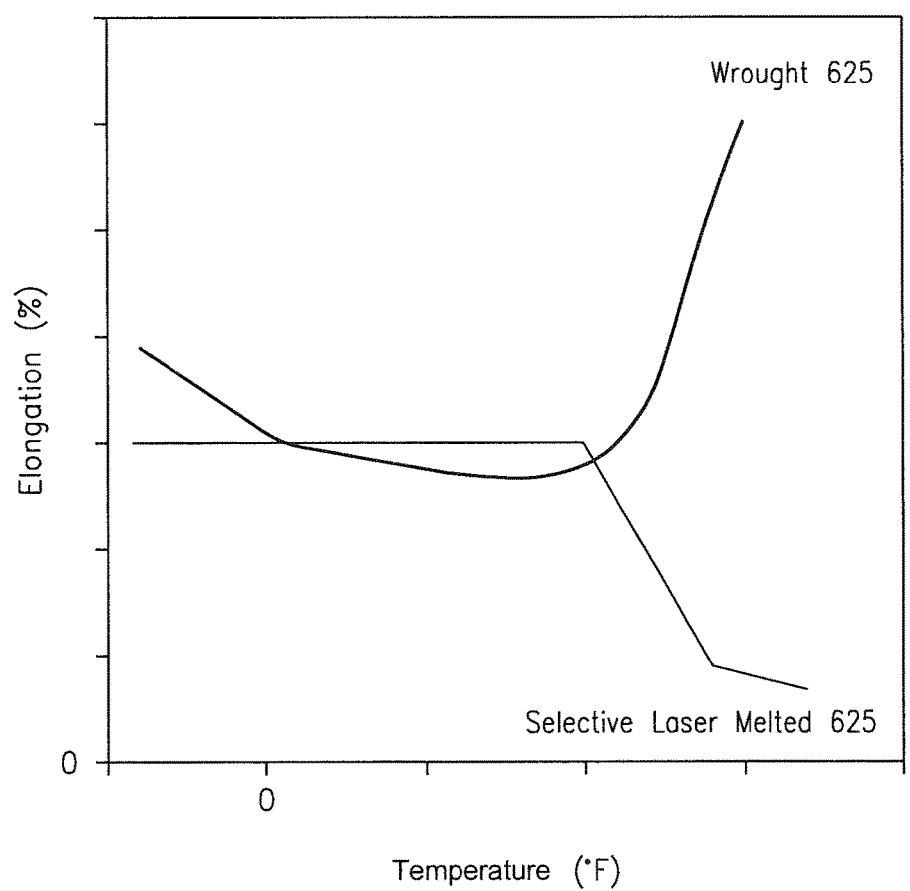
FIG. 2 is a graphical representation of an allowable tensile elongation for SLM-625 manufactured via the process of FIG. 3 and wrought Alloy 625 component.

Additive manufactured components built-up of certain alloys, however, such as those additive manufactured of Alloy 625—referred to herein as "SLM-625"—have been found to inherently have yielded material properties with relatively low elevated-temperature ductility, compared to the corresponding wrought Alloy 625—even when traditional heat treat processes such as stress relief, hot isostatic pressing and solution heat treat are performed thereon. For example, tested SLM-625 samples have had tensile elongations ≤15% at 1400 F and ≤10% at 1700 F, in contrast to wrought Alloy 625 tensile ductility above ~50% at 1400 F and above ~70% at 1700 F (FIG. 2). Stress rupture life is also relatively low in comparison to the wrought Alloy 625. Applicant has determined that one potential root cause is weaker grain boundaries in SLM-625 relative to wrought Alloy 625 due to unique features related to current additive processing and heat treatment. As currently processed, SLM-625 grain boundaries are free of carbides that strengthen wrought Alloy 625 grain boundaries.

Figure 3:
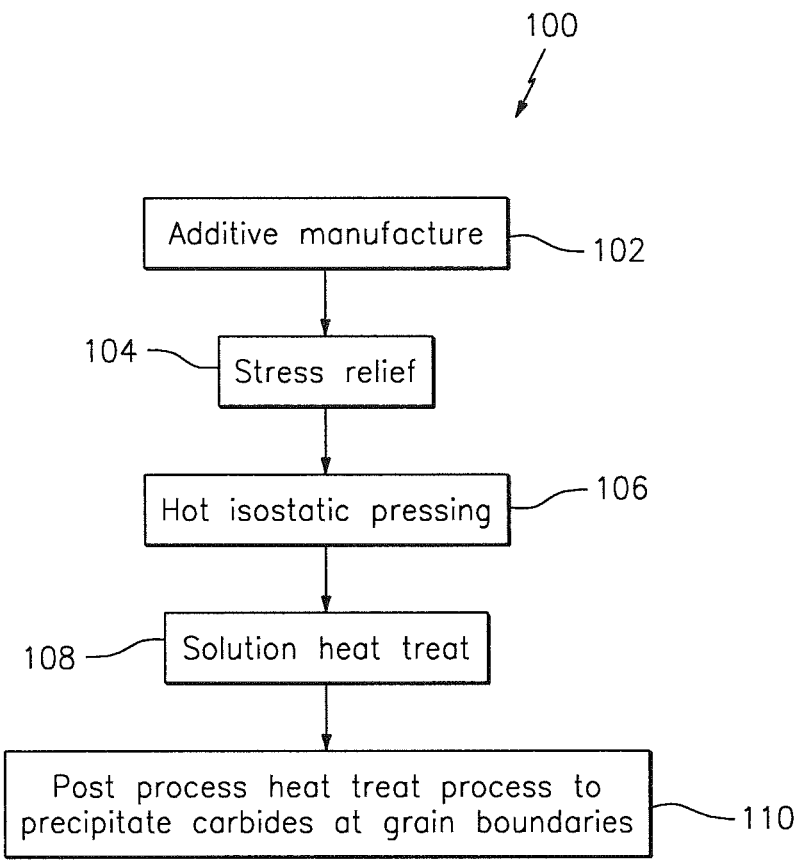
FIG. 3 is an additive manufacturing process for elevated-temperature ductility and stress rupture life according to one disclosed non-liming embodiment.

With reference to FIG. 3, in one disclosed non-limiting embodiment, elevated-temperature ductility and stress rupture life of an additive manufactured component (step 102) are increased by a process 100 that precipitates carbides at grain boundaries via an added heat treat step 110, carried out after completion to the current, conventional heat treat steps for additive manufactured components (steps 104, 106 and 108). Typically, post-build heat treatment is an integral part of the additive manufacturing process. Stress relief (step 104) is required to minimize distortion from residual stresses created during the build cycle, thus maintaining dimensional integrity. Hot isostatic pressing (step 106) closes residual porosity in the fabricated part and solution treatment (step 108) provides the ideal microstructure for most subsequent manufacturing and processing steps.

In one example of the added heat treat step (step 110), heating of conventionally-processed additive manufacturing component of Alloy 625 to 1450 F and holding at 1450 F for approximately 10 hours precipitates the desired carbides at grain boundaries.

Figure 4:
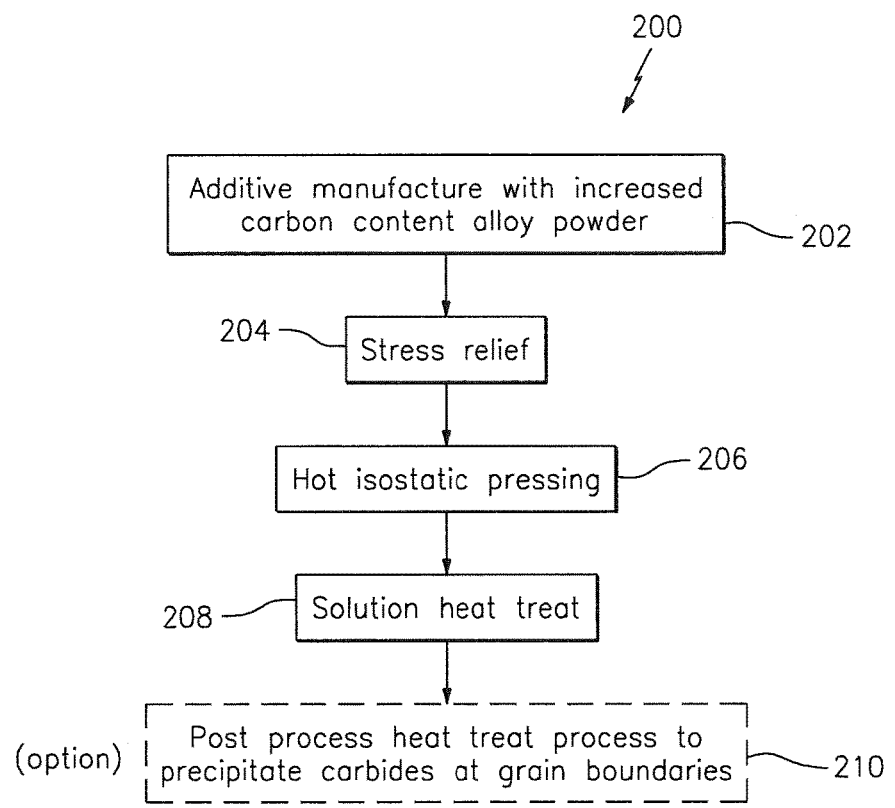
FIG. 4 is an additive manufacturing process for elevated-temperature ductility and stress rupture life according to another disclosed non-liming embodiment.

With reference to FIG. 4, in another disclosed non-limiting embodiment, elevated-temperature ductility and stress rupture life of an additive manufactured component may alternatively or additionally increased by a process 200 that uses an increased carbon content alloy powder such as an alloy powder with more than about 0.02% Carbon during the additive manufacture process (step 202) and in one disclosed non-limiting embodiment between about 0.03% to 0.04% Carbon. That is, particular build-up layers or the entirety of the component may use atomized alloy powder material of increased carbon content. The further post process heat treat process of FIG. 2 may then optionally be performed (step 210) on the previously stress relieved, hot isostatic pressed and solution heat treated component (steps 204-208).

Figure 6:
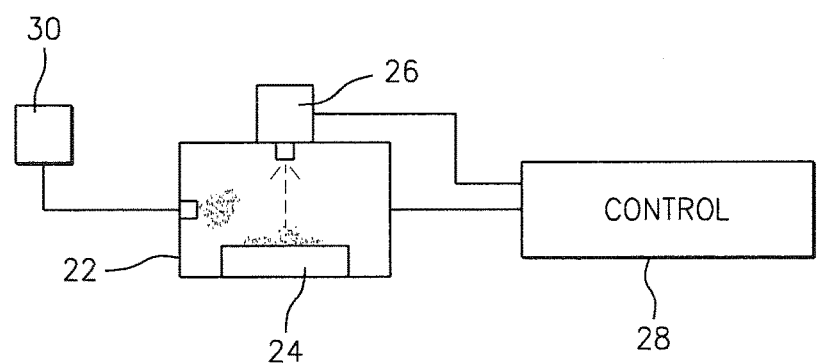
FIG. 6 is a general schematic view of an additive manufacturing system for use with the process of FIG. 5.
Figure 5:
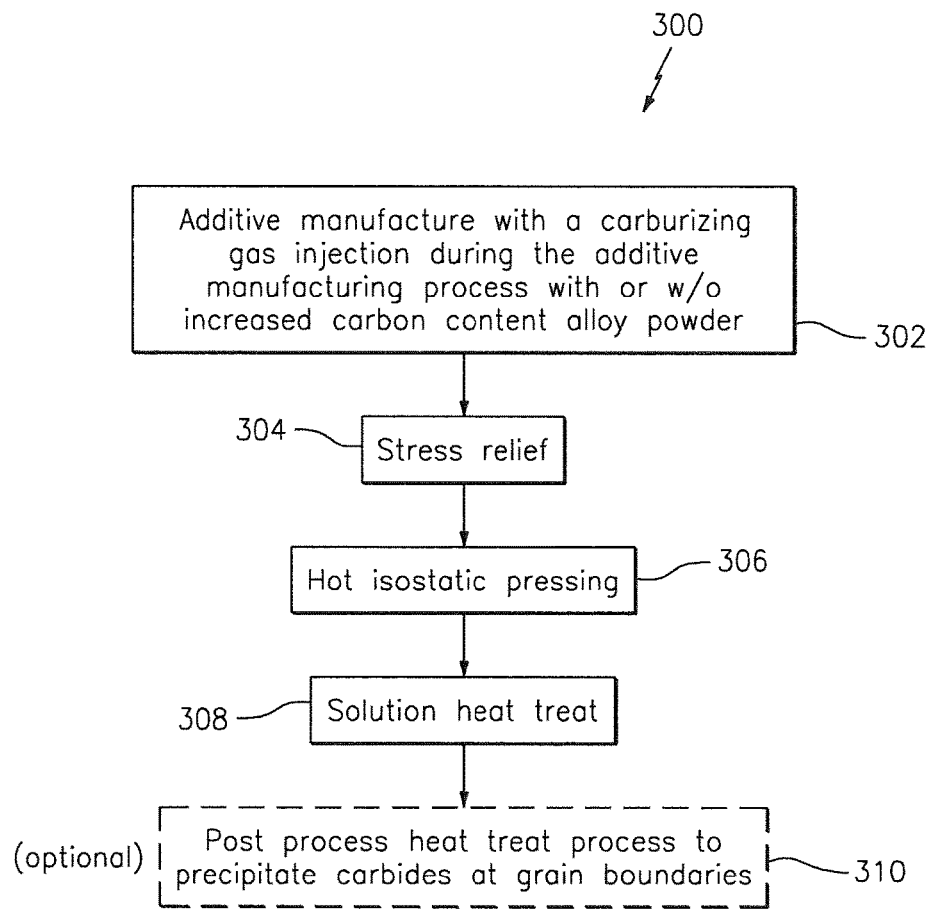
FIG. 5 is an additive manufacturing process for elevated-temperature ductility and stress rupture life according to another disclosed non-liming embodiment.

With reference to FIG. 5, in another disclosed non-limiting embodiment, elevated-temperature ductility and stress rupture life of an additive manufactured component may be alternatively or additionally increased via provisions for carburizing the built material in situ by melting in an environment containing carbon-rich species such as hydrocarbon gases (step 302). That is, an injection system 30 (illustrated schematically; FIG. 6) operates to maintain a carburizing environment in the build chamber 22 during the additive manufacturing process. The carburizing gas may be injected during build up of certain or all layers. Again, the injection of the carburizing gas may optionally be utilized alone or in combination with the post process heat treat process (step 310) of FIG. 2 and/or the increased carbon content alloy powder (FIG. 3).

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the equipment and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An additive manufacturing process comprising:
   selective laser melting a component with an increased carbon content alloy powder during the additive manufacture process, wherein the increased carbon content alloy powder has between 0.03% and 0.04% carbon;
   providing stress relief, hot isostatic pressing and solution heat treat to the component; and
   precipitating carbides at grain boundaries of the component with a heat treat process after the providing stress relief, hot isostatic pressing and solution heat treat to the component.

* * * * *